United States Patent
Lin et al.

(10) Patent No.: US 11,947,496 B2
(45) Date of Patent: Apr. 2, 2024

(54) MULTI-NODE STORAGE SYSTEM AND METHOD DATA DE-DUPLICATION METHOD FOR THE SAME

(71) Applicant: EMC IP Holding Company LLC, Hopkinton, MA (US)

(72) Inventors: Chao Lin, Shanghai (CN); Yuting Zhang, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 138 days.

(21) Appl. No.: 16/882,593

(22) Filed: May 25, 2020

(65) Prior Publication Data
US 2021/0248111 A1    Aug. 12, 2021

(30) Foreign Application Priority Data
Feb. 6, 2020   (CN) .......................... 202010081871.6

(51) Int. Cl.
*G06F 16/174*   (2019.01)
*G06F 11/14*    (2006.01)
*G06F 16/14*    (2019.01)
*G06F 16/182*   (2019.01)

(52) U.S. Cl.
CPC ...... *G06F 16/1748* (2019.01); *G06F 11/1451* (2013.01); *G06F 11/1464* (2013.01); *G06F 16/152* (2019.01); *G06F 16/1824* (2019.01); *G06F 2201/80* (2013.01)

(58) Field of Classification Search
CPC ............. G06F 16/1748; G06F 16/1824; G06F 16/152; G06F 11/1464; G06F 2201/80; G06F 11/1451
See application file for complete search history.

(56) References Cited

U.S. PATENT DOCUMENTS

| | | | | |
|---|---|---|---|---|
| 7,529,834 B1* | 5/2009 | Birrell | ................. | G06F 11/1464 709/226 |
| 8,130,676 B2* | 3/2012 | Shim | ...................... | H04L 45/02 370/254 |
| 8,898,120 B1* | 11/2014 | Efstathopoulos | ....... | G06F 16/11 707/692 |
| 2007/0011321 A1* | 1/2007 | Huntington | ........... | H04L 43/062 709/224 |

(Continued)

OTHER PUBLICATIONS

"EMC Data Domain Global Deduplication Array", EMC Corporation, vol. 1, Jan. 2011 (24 pages).

(Continued)

*Primary Examiner* — Allen S Lin
(74) *Attorney, Agent, or Firm* — Chamberlain, Hrdlicka, White, Williams & Aughtry; Aly Z. Dossa

(57) ABSTRACT

Embodiments of the present disclosure relate to a multi-node storage system and a data deduplication method thereof. The method includes determining a similarity hash value of a super block, wherein the similarity hash value indicates similarity between super blocks The method further includes comparing the similarity hash value of the super block with a feature similarity hash value of a node of the multi-node storage system to determine whether the super block matches the node and, in response to determining that the super block matches the node, allocating the super block to the node.

3 Claims, 12 Drawing Sheets

(56) References Cited

U.S. PATENT DOCUMENTS

2010/0329256 A1* 12/2010 Akella .................... H04L 47/10
370/392
2011/0099351 A1* 4/2011 Condict ................ G06F 3/0608
711/216
2021/0004583 A1* 1/2021 Evans ................. G06F 16/9014

OTHER PUBLICATIONS

NEC Corporation of America, Identifying the Hidden Risk of Data De-duplication: How the HYDRAstor™ Solution Proactively Solves the Problem, Oct. 2006 (9 pages).

* cited by examiner

|   | $S_1$ | $S_2$ | $S_3$ | $S_4$ |
|---|---|---|---|---|
| A | 1 | 0 | 1 | 0 |
| B | 1 | 0 | 0 | 1 |
| C | 0 | 1 | 0 | 1 |
| D | 0 | 1 | 0 | 1 |
| E | 0 | 1 | 0 | 1 |
| F | 1 | 0 | 1 | 0 |
| G | 1 | 0 | 1 | 0 |

≈

|   | $S_1$ | $S_2$ | $S_3$ | $S_4$ |
|---|---|---|---|---|
| $h_1$ | 1 | 2 | 1 | 2 |
| $h_2$ | 2 | 1 | 3 | 1 |
| $h_3$ | 3 | 1 | 3 | 1 |

FIG. 7

MULTI-NODE STORAGE SYSTEM AND METHOD DATA DE-DUPLICATION METHOD FOR THE SAME

CROSS-REFERENCE TO RELATED APPLICATIONS

This application claims priority to Chinese Patent Application No. 202010081871.6 filed on Feb. 6, 2020. Chinese Patent Application No. 202010081871.6 is hereby incorporated by reference in its entirety.

TECHNICAL FIELD

Embodiments of the present disclosure generally relate to storage systems, and more particularly to a method and a device for data deduplication in a multi-node storage system, and a computer-readable storage medium.

BACKGROUND

As data in both physical data centers and cloud data centers are increasing in an explosive manner, conventional single-node data-deduplication storage systems are no longer sufficient. Therefore, there are great challenges in providing reasonable throughput and scalable capacity required to meet the service level agreement (SLA). Next generation clustered storage systems can solve this problem by providing a cluster with multiple scalable data-deduplication storage system nodes.

The size of data processed by a clustered data-deduplication storage system may be at a petabyte (PB) order, an exabyte (EB) order or even a higher order, and therefore, one of the key points to reduce such big data is data deduplication.

Compared with single-node data-deduplication storage systems, clustered data-deduplication storage systems face more challenges in terms of data deduplication. For a single node, all data are saved as blocks of a fixed size or of variable sizes in a single node and deduplicated, so global data will be deduplicated naturally. However, for a clustered system, data deduplication is much more complicated, because each node in the cluster independently deduplicates data within the node, and lack of data deduplication between nodes will significantly reduce the global data deduplication rate, thus wasting storage space.

SUMMARY

Embodiments of the present disclosure provide a method and a device for data deduplication in a multi-node storage system, a computer-readable storage medium and a computer program product.

In a first aspect, a method for data deduplication in a multi-node storage system is provided. The method includes: determining a similarity hash value of a super block, wherein the similarity hash value indicates similarity between super blocks; comparing the similarity hash value of the super block with a feature similarity hash value of a node of the multi-node storage system to determine whether the super block matches the node; and in response to determining that the super block matches the node, allocating the super block to the node.

In a second aspect, an electronic device is provided. The device includes: a processing unit; a memory coupled to the processing unit and including instructions stored therein, the instructions causing the device to perform actions when being executed by the processing unit, the actions including: determining a similarity hash value of a super block, wherein the similarity hash value indicates similarity between super blocks; comparing the similarity hash value of the super block with a feature similarity hash value of a node of the multi-node storage system to determine whether the super block matches the node; and in response to determining that the super block matches the node, allocating the super block to the node.

In a third aspect, a computer-readable storage medium is provided, machine-executable instructions are stored in the computer-readable storage medium, and when being executed by at least one processor, the machine-executable instructions cause the at least one processor to implement the method according to the first aspect.

In a fourth aspect, a computer program product is provided, and the computer program product is stored in a computer-readable medium and includes machine-executable instructions that may cause a machine to perform the method according to the first aspect when executed.

The summary is provided to introduce a selection of concepts in a simplified way, and these concepts will be further described in the following specific embodiments. The summary is neither intended to identify key features or major features of the present disclosure nor intended to limit the scope of the present disclosure.

BRIEF DESCRIPTION OF DRAWINGS

The above and other objectives, features and advantages of the present disclosure will become more apparent by describing example embodiments thereof in further detail with reference to the accompanying drawings, and in the example embodiments of the present disclosure, the same reference numerals generally represent the same components.

FIGS. 4-7 show a MinHash method according to some embodiments of the present disclosure;

DETAILED DESCRIPTION OF EMBODIMENTS

Preferred embodiments of the present disclosure will be described in more detail below with reference to the accompanying drawings. Although the drawings illustrate the preferred embodiments of the present disclosure, it should be understood that the present disclosure may be implemented in various forms and should not be limited to the embodiments illustrated herein. Rather, these embodiments are provided to make the present disclosure more thorough and complete, and will fully convey the scope of the present disclosure to those skilled in the art.

The term "include," "comprise" and variations thereof used herein mean open-ended inclusion, i.e. "including but not limited to." Unless specifically stated, the term "or" means "and/or." The term "based on" means "at least partially based on." The terms "an example embodiment" and "an embodiment" mean "at least one example embodiment." The term "another embodiment" means "at least one additional embodiment." The terms "first," "second" and the like may refer to different or identical objects. Other explicit and implicit definitions may also be included below.

In order to solve the problem of global data deduplication in clustered storage systems, a larger block size may be used, e.g., a block size of 64 KB. This may provide better data locality and lower computational and memory overheads, but also affects redundancy check. As a result, such a solution realizes data deduplication between cluster nodes, but in each node, due to a large block size, the data deduplication rate is reduced.

In some embodiments, super block-based stateless data routing may be used, thereby distributing similar data at a coarse-grained super block level among cluster nodes to preserve data locality. On the other hand, fine-grained block-level data deduplication is performed in each cluster node to achieve high data deduplication efficiency. However, since stateless routing uses only the first 64 bytes from a super block for routing, it will suffer from severe load imbalance in a large cluster.

In some embodiments, a global data deduplication solution based on similarity hashing is proposed for clustered storage systems. In this solution, super block information is compressed into a single hash value called "similarity hash value," which retains the similarity relation of the original super block. For example, compression may be performed through MinHash and locality sensitive hashing (LSH) algorithms. The calculated similarity hash value may be used to evaluate the similarity between different super blocks, and super blocks with the same or similar hash value may be routed to the same cluster node. In this way, data may be better utilized, and a better duplication rate and a balance between cluster nodes may be achieved.

Figure 1:
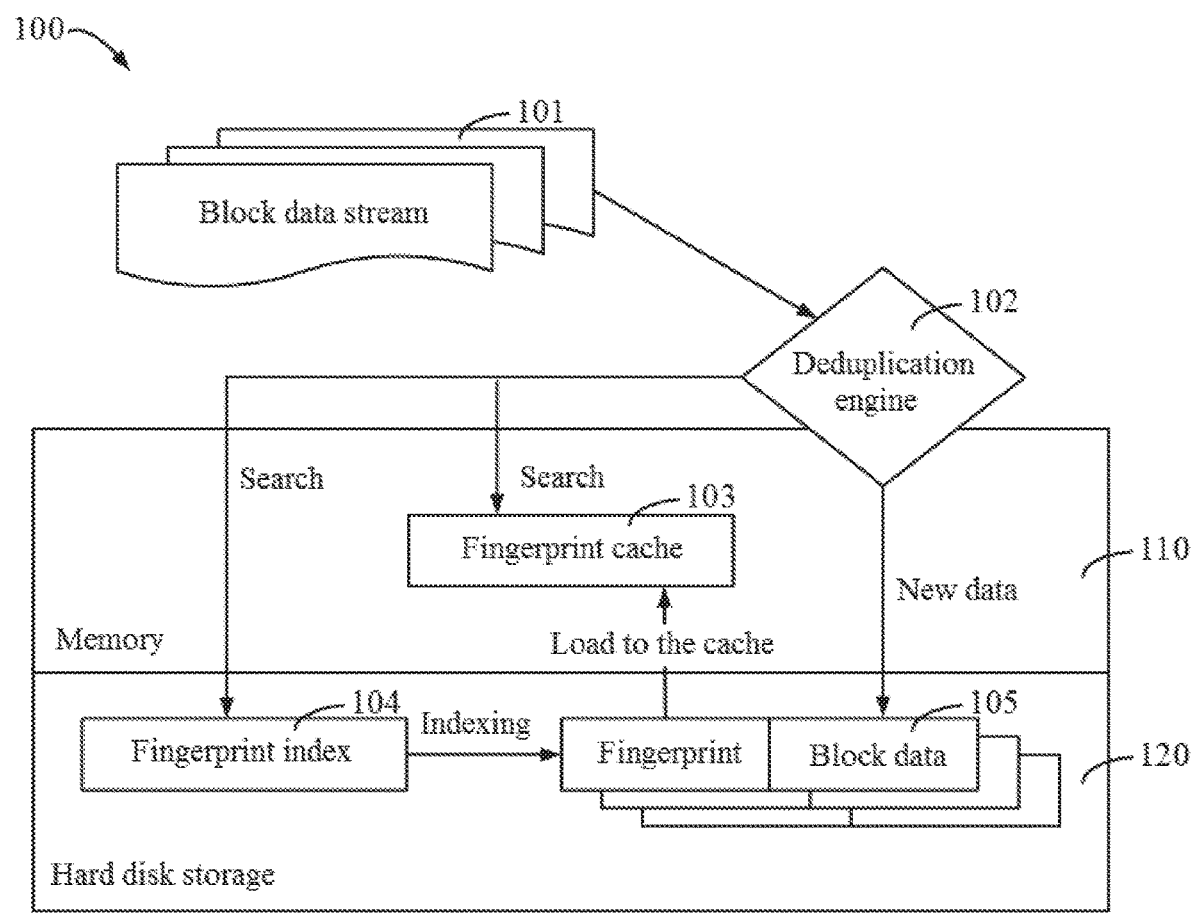
FIG. 1 shows a schematic diagram of a single-node storage system according to some embodiments of the present disclosure.

FIG. 1 shows a schematic diagram of a single-node storage system 100 according to some embodiments of the present disclosure. As shown in FIG. 1, incoming data is first divided into blocks of variable sizes to form block data stream 101, wherein the block size is 4 KB to 8 KB on average. For each block, a hash value is calculated to uniquely identify the data of this block. The hash value is called a "fingerprint" of the block and has an average size of 20 bytes. In addition, the mapping between the fingerprint and the block data is kept on a hard disk, which is called fingerprint index 104. Given a specific fingerprint, the fingerprint index is used to search for corresponding block data 105.

The size of fingerprint index 104 increases along with the size of the protected storage, so it may be too large to be completely stored in memory 110. Therefore, fingerprint cache 103 will remain in the memory, only retaining a portion of the whole fingerprint indexes.

For each piece of incoming block data, deduplication engine 102 first searches to check whether the fingerprint of the block data exists in fingerprint cache 103 in memory 110. If so, the block data will be copied without occupying extra space.

If the fingerprint of the block data does not exist in fingerprint cache 103, it is further checked by searching whether the fingerprint exists among the fingerprint indexes in hard disk storage 120. If so, the block data is copied without occupying extra space; and if not, this block data is new data and will occupy extra space in hard disk storage 120.

Figure 2:
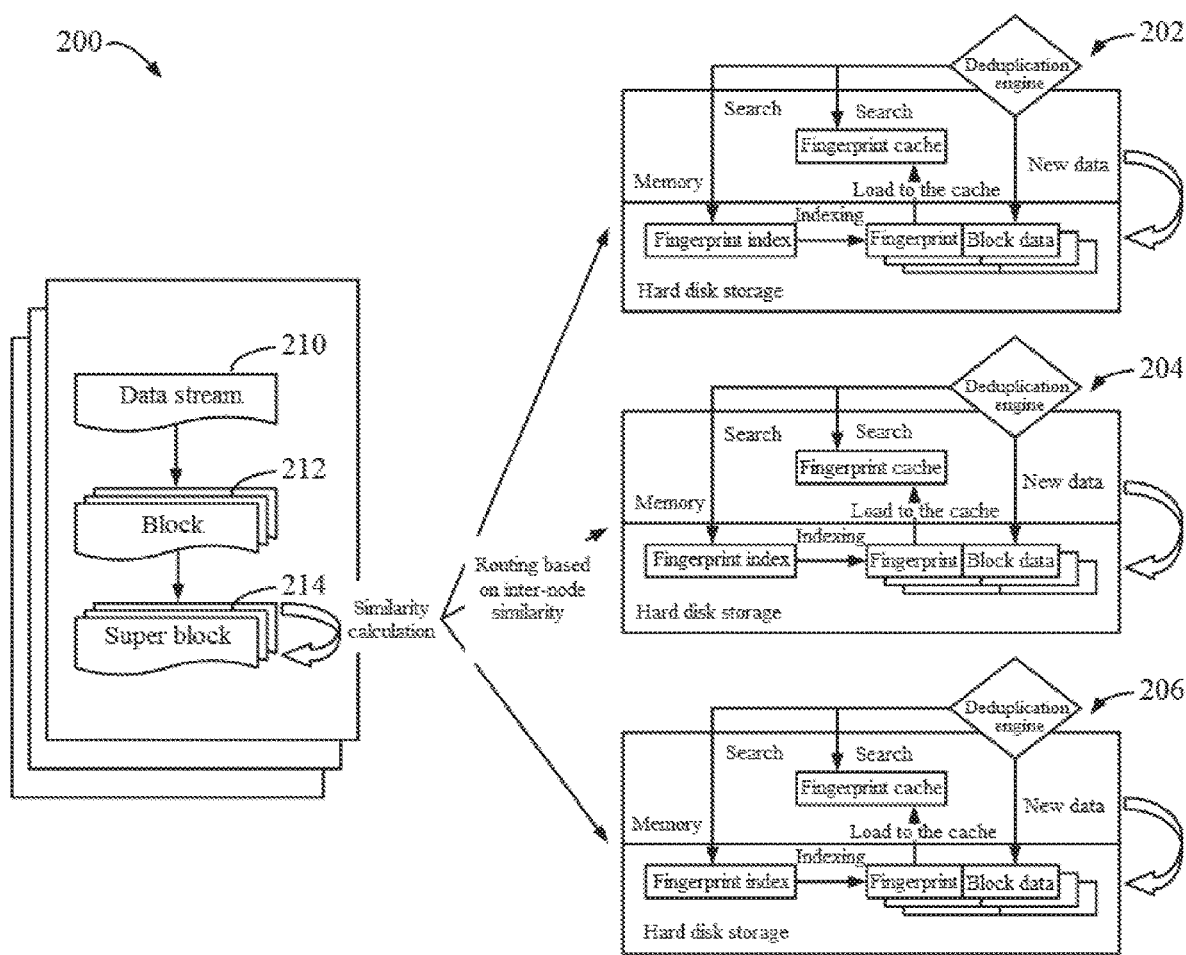
FIG. 2 shows a schematic diagram of a multi-node storage system according to some embodiments of the present disclosure.

FIG. 2 shows a schematic diagram of a multi-node storage system 200 according to some embodiments of the present disclosure. As shown in FIG. 2, multi-node storage system 200 includes node 202, node 204, and node 206, wherein each node may have the same structure as single-node storage system 100 shown in FIG. 1, and may implement the same intra-node deduplication mechanism. It should be understood that multi-node storage system 200 may also include more or fewer nodes, and as data increases, multi-node storage system 200 may be scaled up to add more nodes.

As shown in FIG. 2, data stream 210 may be divided into blocks 212 and a plurality of blocks 212 may be merged into super block 214. A target storage node in a multi-node cluster is dynamically selected before performing data backup. For example, a similarity hash value of each super block 214 may be calculated to determine which node super block 214 should be routed to.

Figure 3A:
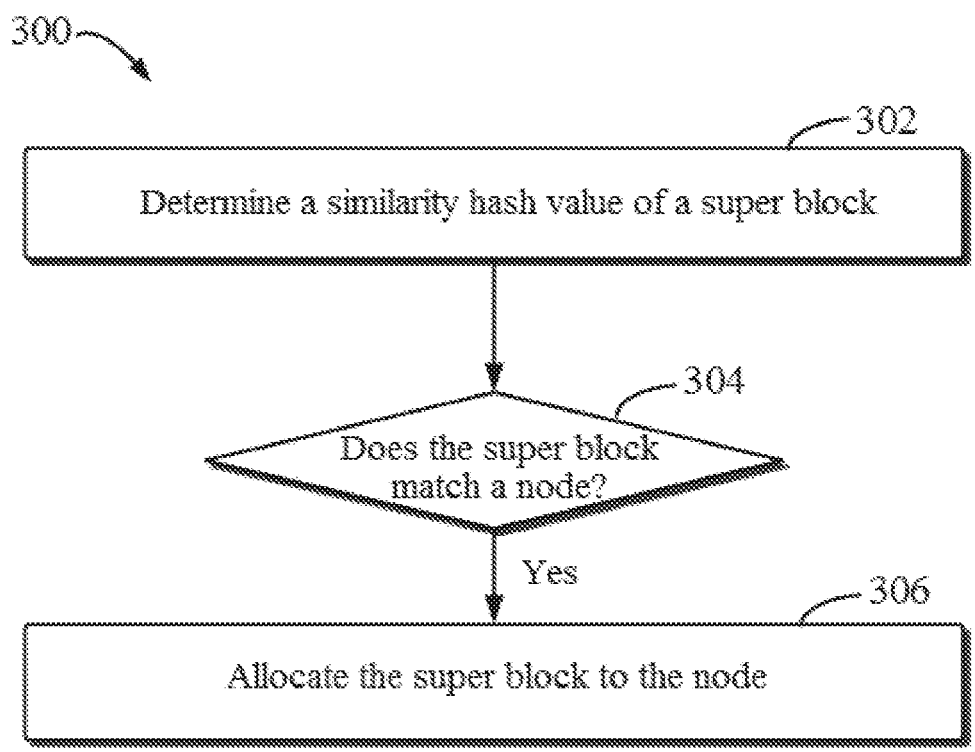
FIGS. 3A and 3B show flowcharts of a data deduplication method according to some embodiments of the present disclosure.

FIG. 3A shows a flowchart of a method 300 for data backup of a clustered storage system according to some embodiments of the present disclosure.

In block 302, a similarity hash value of a super blocks is determined, wherein the similarity hash value indicates similarity between super blocks. In some embodiments, a signature matrix of a backup in which the super block is contained may be determined by taking blocks as features or elements through MinHash. This will be described in detail below with reference to block 316 in FIG. 3B. For example, the super block may be sampled to obtain part of blocks therein, and the signature matrix of the super block may be determined by taking the part of blocks as features. In this way, the computational efficiency may be increased and the computation time may be reduced.

In some embodiments, determining the signature matrix for the super block includes: determining a binary feature matrix for the backup, the binary feature matrix indicating whether a corresponding super block among a plurality of super blocks of the backup includes corresponding blocks; and simplifying the binary feature matrix through MinHash to obtain the signature matrix.

In some embodiments, determining the binary feature matrix includes: determining feature matrices for the plurality of super blocks of the backup; determining a set of all features of the backup based on the feature matrices; and determining whether the features in the set are within the corresponding super blocks to determine the binary feature matrix.

In some embodiments, the similarity hash value may be calculated based on a signature matrix through locality sensitive hashing. This will be described in detail below with reference to block 318 in FIG. 3B.

In block 304, the similarity hash value of the super block is compared with a feature similarity hash value of a node of the storage system to determine whether the super block matches the node.

In some embodiments, the feature similarity hash value of the node includes a similarity hash value range. It is compared to check whether the similarity hash value of the super block is within the similarity hash value range.

If it is determined in block 304 that the super block matches a node, method 300 proceeds to block 306 to allocate the super block to the node.

Figure 3B:
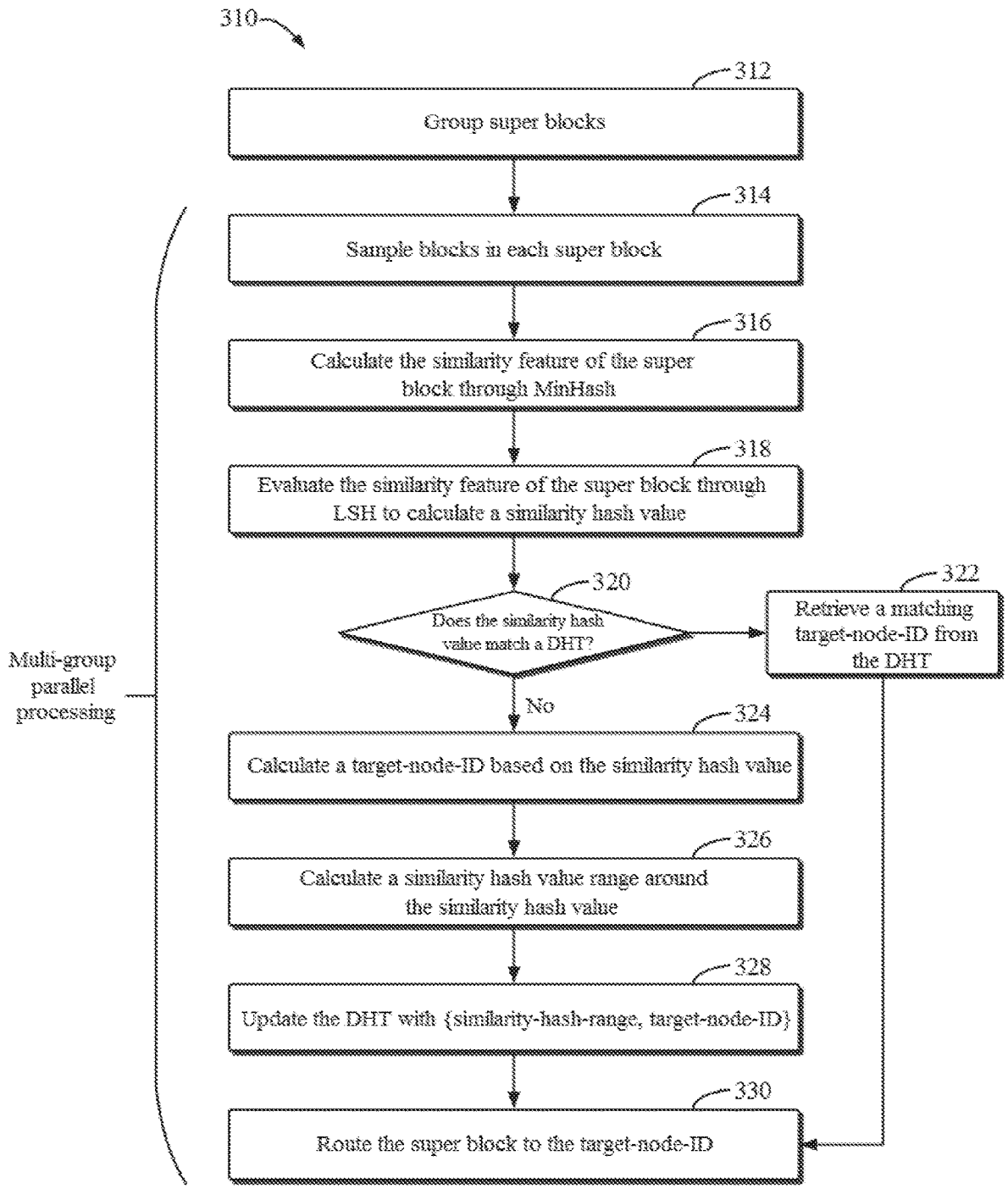

FIG. 3B shows a flowchart of a method 310 for data backup of a clustered storage system according to some embodiments of the present disclosure.

In block 312, super blocks in a backup are divided into a plurality of subgroups to perform parallel computation.

Generally, it is possible to calculate how many common blocks there are between two super blocks in order to calculate similarity between the two super blocks. However, this solution is impractical due to high computational and memory overheads. For each comparison, two nested loops are required to compare all blocks one by one. In general, the time complexity of such comparison is O(n3), which is unacceptable.

Each block in the super block may be called a feature of the super block. Therefore, each super block may have multi-dimensional features. In order to obtain a better data deduplication rate, similar super blocks should be identified and routed to the same cluster node. However, for a large number of super blocks with high-dimensional features, similarity calculation will be a time-consuming task. Conventional nearest neighbor search algorithms (such as KNN, KD tree and other paired comparison methods) are not feasible in this case of big data, because comparing the features of all paired super blocks is quadratic in number, leading to the problem of "curse of dimensionality." Delay should be controlled within a relatively low boundary to ensure the throughput efficiency of the clustered system.

The hash value is proposed here as a representation of the super block for the calculation of super block similarity. How the representation of the super block is generated will be described in detail below.

The super block feature matrix $H_{m*n}$ of a backup may be expressed as:

TABLE 1

$$\begin{pmatrix} X_{11} & \cdots & X_{1j} \\ \vdots & \ddots & \vdots \\ X_{i1} & \cdots & X_{ij} \end{pmatrix}$$

wherein $X_{ij}$ is an element of the matrix $H_{m*n}$, and $i \in m$, $j \in n$.

The features of super blocks have been constructed into a two-dimensional matrix, as shown in Table 1. Here, the matrix is named $H_{m*n}$. For the matrix $H_{m*n}$, m is the total number of the super blocks, and n is the feature size of each super block.

In block 314, instead of all blocks, only the sample blocks in a super block are selected for calculation. This is because the feature matrix contains only the selected sample blocks to avoid high computational overhead considering that the number of features of a single super block may also be large.

A set $V_z$ containing all the super block features will be created by uniting all the super block features. The total feature number is z.

$V = H_1 \cup H_2 \cup H_3 \cup H_i$

Each $H_i$ contains all features of a single backup, wherein $i \in m$.

For example, given the feature matrix shown in Table 1, the complete super block feature set should combine the features of each super block with a uniting operation. The set $V_z$ of the feature matrices in Table 1 should be:

TABLE 2

1fcb78999 . . .
f5701d1d . . .
34e3342a0c . . .
1bc7e83c5a0 . . .
0826b1c32 . . .
9a096b7a5 . . .

The next step is to express the feature matrix $H_{m*n}$ as a Boolean matrix, and the size of the matrix will be z*m. Rows with a size of z represent all possible features from the set $V_z$. Columns with a size of m represent the number of super blocks.

For M(r, S)=1, it means that only when r is a member of S, it is represented in the row r and the column S. If the super block feature set S contains the feature r, the corresponding value in the matrix M will be 1. Generally, the matrix M is a sparse matrix.

For the feature matrix in Table 1, the corresponding Boolean matrix $M_{z*m}$ should be:

TABLE 3

| Block Hash | Super Block 1 | Super Block 2 | Super Block m |
|---|---|---|---|
| 1fcb78999 . . . | 1 | 0 | . . . |
| f5701d1d . . . | 1 | 0 | . . . |
| 34e3342a0c . . . | 1 | 0 | . . . |
| 1bc7e83c5a0 . . . | 0 | 1 | . . . |
| 0826b1c32 . . . | 0 | 1 | . . . |
| 9a096b7a5 . . . | 0 | 1 | . . . |

In block 316, MinHash is used to reduce the multi-dimensional feature matrix of the super block. The output is a simplified matrix representing the super block function. For example, MinHash may be used to reduce the dimensionality of the matrix M for further similarity calculation.

The following is a brief description of the steps performed by MinHash:
a. A random permutation of rows is selected for the matrix M
b. A hash function is defined for the set S
   i. h(s)=index of the first row with 1 in the column S (in the permutation order).
   ii or
   iii h(S)=index of the first element of S in the permutation order.
c. k (e.g. k=100) independent random permutations are used to create signatures. FIGS. 4-7 show an example of the MinHash algorithm. In this example, the sets $S_1$~$S_4$ each contain features with 7 Boolean numbers. Let k=3, that is, three random permutations are used to calculate MinHash signatures.

Figure 4:
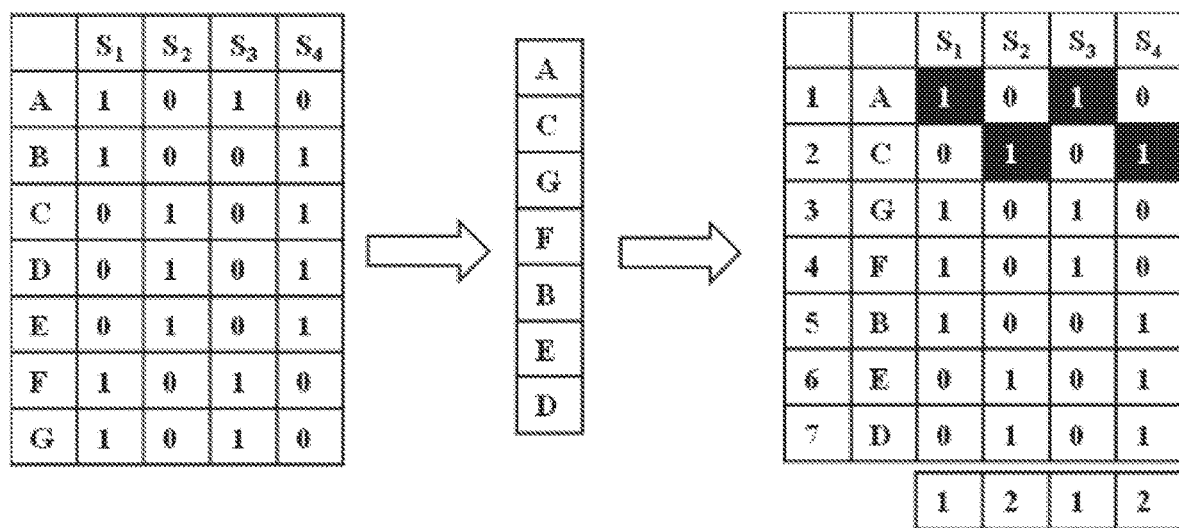
Figure 5:
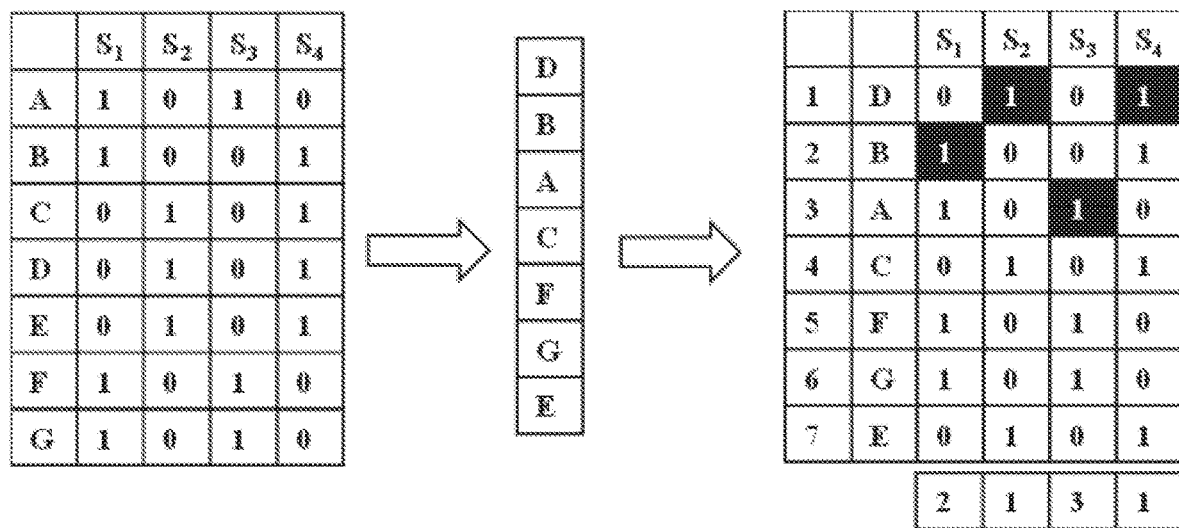
Figure 6:
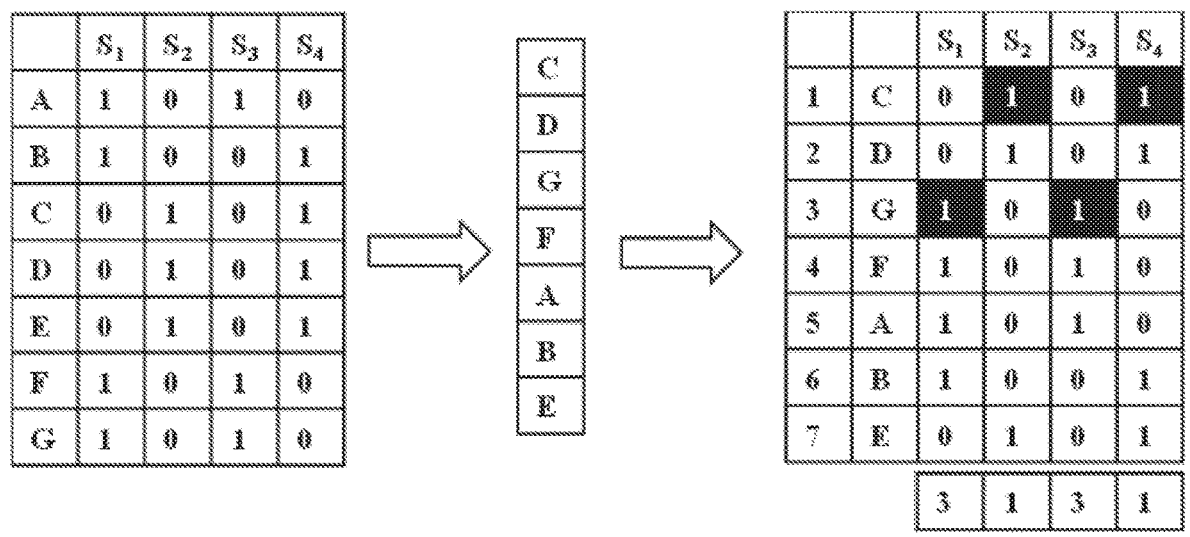

As shown in FIG. 4, the rows of the Boolean matrix M are randomly arranged, wherein the first "1" in 51 appears in the first row, so h(S1)=1; the first "1" in S2 appears in the second row, so h(S2)=2; the first "1" in S3 appears in the first row, so h(S3)=1; and the first "1" in S4 appears in the second row, so h(S4)=1. Therefore, the permutation of FIG. 4 obtains signatures {1, 2, 1, 2}. FIGS. 5-6 show the other two different permutations, and corresponding signatures can be obtained according to methods similar to that in FIG. 4.

In FIG. 7, the signatures obtained in FIGS. 4-6 are merged together to form a signature matrix, which is a compressed representation of the Boolean matrix M.

Finally, if h<n (h represents the number of independent random permutations), then a small signature matrix $MH_{h*m}$ will be an equivalent compressed representation of the sparse matrix M. In other words, the signature matrix has good approximation.

By converting the super block feature matrix into a smaller matrix, the similarity of the signature matrix can be calculated. For the signature matrix $MH_{h*m}$, the smaller h is, the higher the probability of false positive of MinHash similarity. In order to control the possibility of false positive, many values of h may still need to be selected. If a vector-distance calculation method is used to calculate the similarity of the signature matrix, the problem of "curse of dimensionality" still cannot be completely solved. It is assumed that with an increase in the size of super blocks, for 106 super blocks, this means $5*10^{11}$ comparisons. If the computation speed is 1 microsecond/comparison, it will take six days to complete the comparisons.

In block 318, a similarity hash value is calculated based on the feature matrix or the signature matrix through locality sensitive hashing (LSH) to uniquely represent the super block.

If the goal is to calculate the similarity of each pair, although parallel computation may reduce the time consumed, it is unable to reduce the workload. However, generally only the most similar pair or all pairs above the lower similarity limit are desired. Therefore, it is only necessary to focus on pairs that may be similar, instead of investigating each pair. Locality sensitive hashing (LSH) may solve this problem.

Figure 8A:
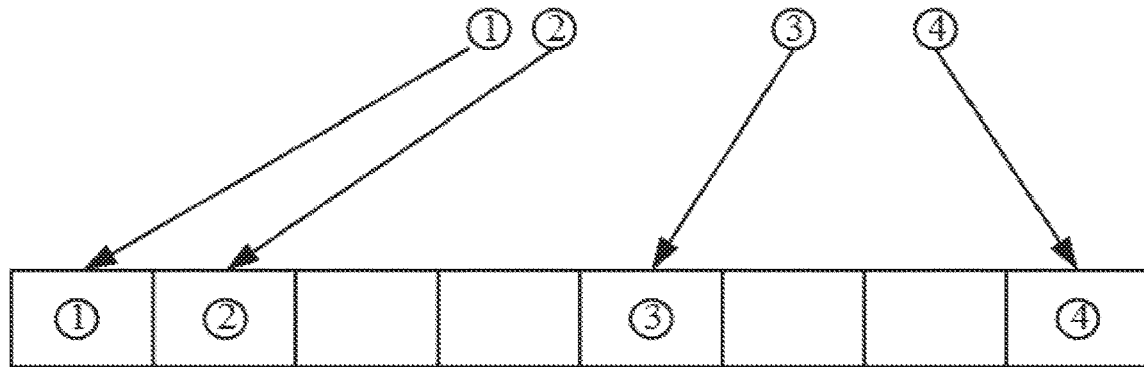
FIG. 8A shows a schematic diagram of ordinary hashing according to some embodiments of the present disclosure.
Figure 8B:
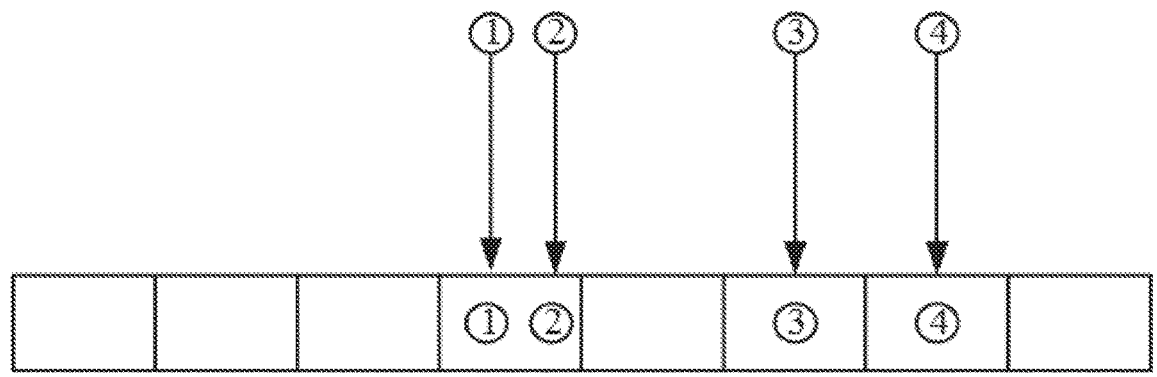
FIG. 8B shows a schematic diagram of locality sensitive hashing according to some embodiments of the present disclosure.

FIGS. 8A and 8B respectively show schematic diagrams of ordinary hashing and locality sensitive hashing (LSH). As shown in FIG. 8A, ordinary hashing respectively maps data to corresponding hash values, while these hash values do not keep the similarity of the original data. On the other hand, locality sensitive hashing (LSH) maps similar data into the same bucket, and maps dissimilar data into different buckets, thus keeping the similarity of the original data as much as possible.

Locality sensitive hashing (LSH) is an algorithm that is used to solve approximate or accurate neighbor search in a high-dimensional space. LSH "hashes" items several times to make similar items more likely to be hashed into the same bucket, thus becoming a candidate pair. In this way, it is not necessary to calculate the similarity of each pair, but only to check whether the candidate pair is similar.

Figure 9:
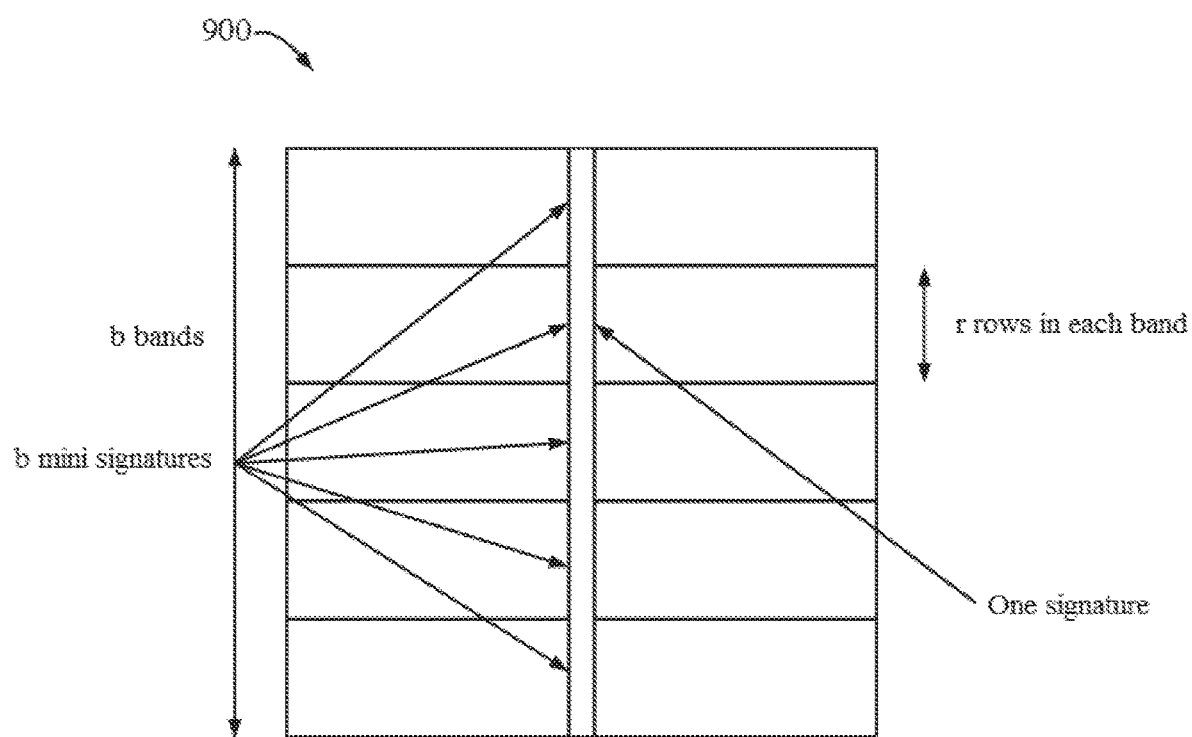
FIG. 9 shows a schematic diagram of a signature matrix according to some embodiments of the present disclosure.
Figure 10:
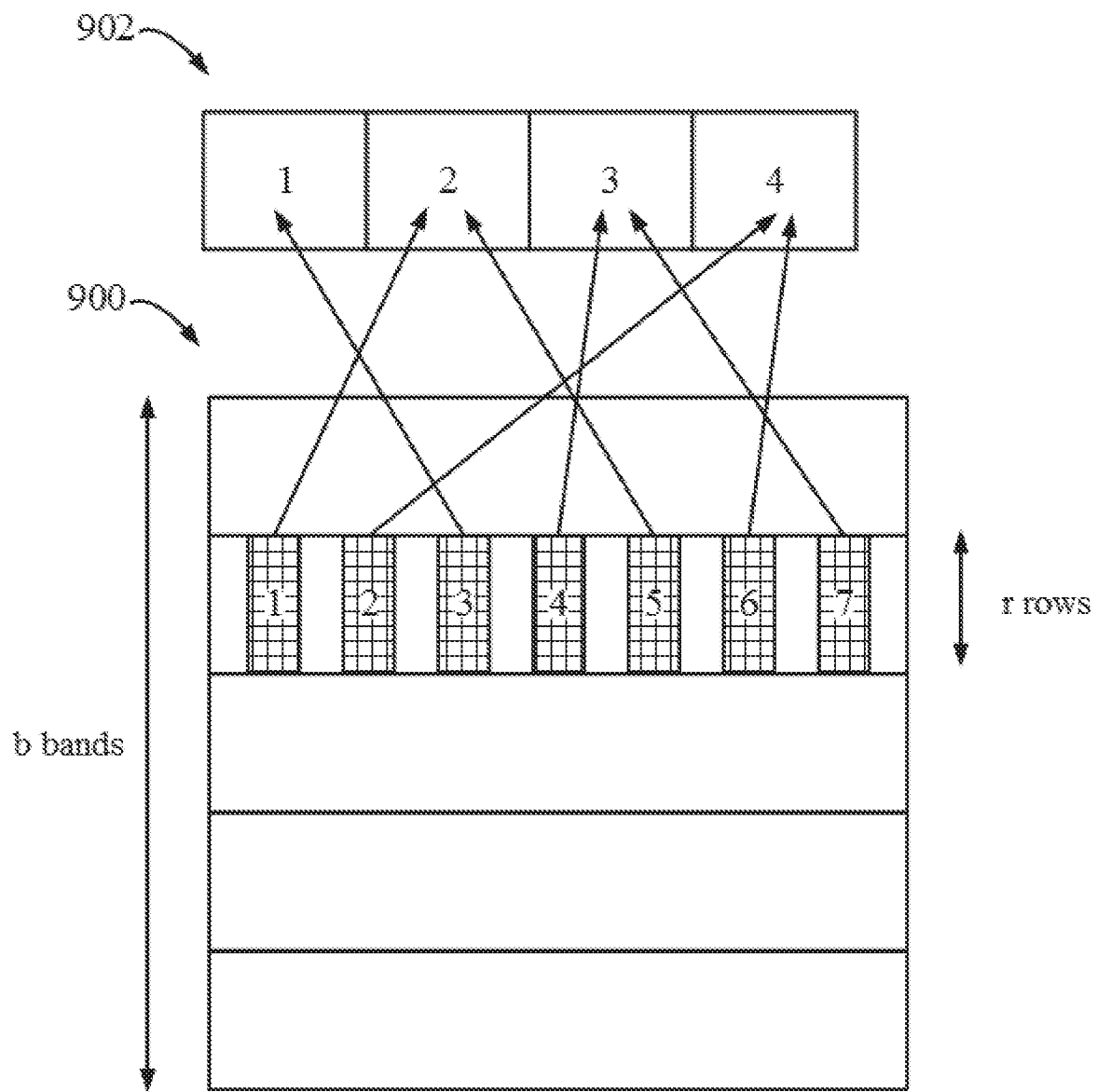
FIG. 10 shows a schematic diagram of mapping of locality sensitive hashing according to some embodiments of the present disclosure.

FIGS. 9 and 10 show schematic diagrams of locality sensitive hashing according to some embodiments of the present disclosure. As shown in FIG. 9, signature matrix 900 may be divided into b bands, wherein each band is composed of r rows. For each band, a hash function may be set. The input of this function is a vector (also called mini signature) composed of r integers in this band. This function hashes this vector into a corresponding bucket. Therefore, each signature may be hashed b times. At least one pair hashed into the same bucket in a band may be considered as a candidate pair. It should be noted that the same hash function may be used for all bands, but different bands use different bucket arrays, so that different bands will not be hashed into the same bucket.

As shown in FIG. 10, hash table 902 includes four buckets; however, in general, hash table 902 may include a large number of buckets. For one band of signature matrix 900, mini signature 2 and mini signature 6 are mapped into the same bucket. Therefore, signature 2 and signature 6 may be considered as a candidate pair.

According to the embodiments of the present disclosure, LSH can generate integral hash values, and hash values are similar for similar inputs. Therefore, hash values generated by LSH are also referred to as similarity hash values. All MinHash values in each band may be calculated into an LSH hash table one by one through LSH. For incoming super blocks with MinHash, the LSH hash table may be used to obtain similar backups, and the time complexity is O(1). In addition, false negative may be reduced by adjusting variables b and r according to the requirement of similarity.

Returning now to FIG. 3B, in block 320, whether the similarity hash value matches a distributed hash table (DHT) is determined.

The distributed hash table (DHT) is a type of distributed system, which provides a search service similar to a hash table, except that the mapping from keys to values is distributed among all nodes. This enables the DHT to be extended to many nodes, such as a clustered data-deduplication storage system. Alternatively, the distributed hash table (DHT) may also be implemented using a centralized hash table.

The DHT is used to record similarity hash value range and target node ID pairs {similarity-hash-range, target-node-ID} to accelerate the determination of a target node. Any super block whose similarity hash value falls within a similarity hash value range will be routed to a specified target node ID. This is because super blocks with similarity hash values within the same range have the possibility of sharing more common blocks.

By specifying appropriate similarity hash range values and using the DHT as a cache, the target node determination process may be accelerated.

If it is determined in block 320 that the similarity hash value matches the DHT, method 310 proceeds to block 322 to retrieve a matching target node ID from the DHT. Then, in block 330, the super block is routed to the target node ID specified in the DHT.

If it is determined in block 320 that no item matching the similarity hash value is found in the DHT, method 310 proceeds to block 324 to calculate a target node ID based on the similarity hash value. For example, the following equation may be used to calculate a target node ID, wherein N represents the number of cluster nodes.

Target Node ID=(Similarity Hash Value)/1000% N

First, the similarity hash value is divided by 1000 to filter out the influence of low-order digits. Then, a specific target node ID is found by quotient modulo N.

In block 326, for the given similarity hash value, its surrounding neighbor range is obtained by subtracting <range_number> from and adding <range_number> to the similarity hash value, wherein range_number is an adjustable parameter, depending on different data patterns and cluster environments. For example, range_number may be set as 10000.

In block 328, the DHT is updated with the neighbor range and the target node ID as {similarity-hash-range, target-node-ID}.

It should be noted that after DHT records are updated, some overlaps may exist between the similarity hash value ranges, so the similarity hash value ranges may be modified (such as merged) through background post-processing of the DHT.

Then, in block 330, the super block is routed to the calculated target node ID.

For backups, determining a backup target is very critical, and by method 310, the time complexity is O(1). This means that no matter how many backups there are, each backup has a plurality of super blocks, and the search time is basically a relatively small constant.

In general, the balance of data deduplication effect cannot be achieved within a single node and among multiple cluster nodes. A compromise must be made between block granularity and cluster size. According to the embodiments of the present disclosure, MinHash and LSH may be used to represent and calculate super block-level similarity, and a DHT may be used to route similarity hash values to corresponding storage nodes. Therefore, a good balance of data deduplication effect is achieved within a single node and among multiple cluster nodes, and the scalability of the storage cluster is also improved.

Figure 11:
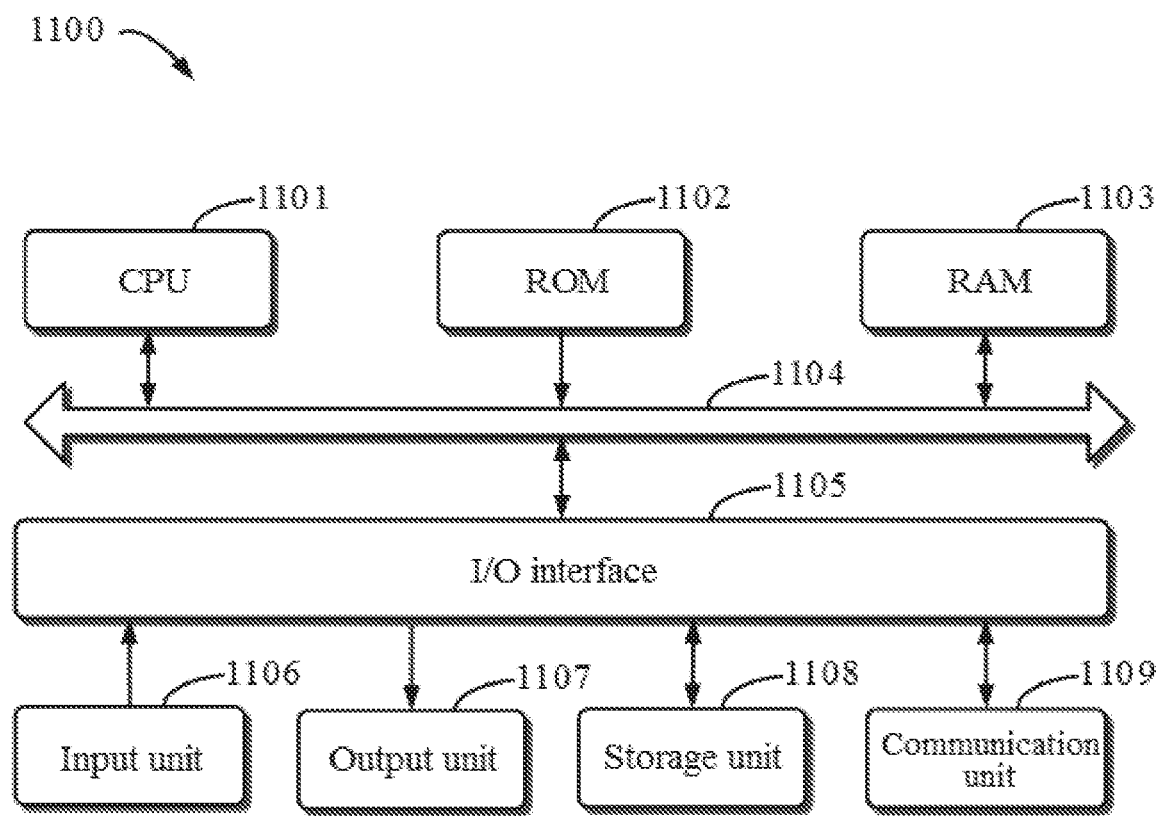
FIG. 11 shows a schematic block diagram of an example device that can be configured to implement embodiments of the present disclosure according to some embodiments of the present disclosure.

FIG. 11 shows a schematic block diagram of device 1100 that may be used to implement the embodiments of the present disclosure. As shown in FIG. 11, device 1100 includes central processing unit (CPU) 1101 that can perform various appropriate actions and processing according to computer program instructions stored in read-only memory (ROM) 1102 or computer program instructions loaded from storage unit 1108 into random access memory (RAM) 1103. In RAM 1103, various programs and data required by the operation of device 1100 may also be stored. CPU 1101, ROM 1102 and RAM 1103 are connected to one another through bus 1104. Input/output (I/O) interface 1105 is also connected to bus 1104.

A plurality of components in device 1100 are connected to I/O interface 1105, including input unit 1106, such as a keyboard and a mouse; output unit 1107, such as various types of displays and speakers; storage unit 1108, such as a magnetic disk and an optical disk; and communication unit 1109, such as a network card, a modem and a wireless communication transceiver. Communication unit 1109 allows device 1100 to exchange information/data with other devices through a computer network, such as the Internet, and/or various telecommunication networks.

The various processes and processing described above, such as method 300 and method 310, may be performed by processing unit 1101. For example, in some embodiments, method 300 and method 310 may be implemented as computer software programs that are tangibly contained in a machine-readable medium, such as storage unit 1108. In some embodiments, the computer programs may be partially or completely loaded and/or installed into device 1100 via ROM 1102 and/or communication unit 1109. When the computer programs are loaded into RAM 1103 and executed by CPU 1101, one or more steps of method 300 and method 310 described above may be performed.

The present disclosure may be a method, a device, a system, and/or a computer program product. The computer program product may include a computer-readable storage medium storing computer-readable program instructions for performing various aspects of the present disclosure.

The computer-readable storage medium may be a tangible device that can retain and store instructions for use by an instruction execution device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: portable computer disks, hard disks, random access memories (RAMs), read only memories (ROMs), erasable programmable read only memories (EPROMs or flash memories), static random access memories (SRAMs), portable compact disk read only memories (CD-ROMs), digital versatile disks (DVDs), memory sticks, floppy disks, mechanical encoding devices (such as punched cards or in-groove raised structures storing instructions), and any suitable combination of the above. The computer-readable storage medium used here is not to be interpreted as instantaneous signals per se, such as radio waves or other freely propagated electromagnetic waves, electromagnetic waves propagated through waveguides or other transmission media (e.g. optical pulses through fiber-optic cables), or electrical signals transmitted through electrical wires.

The computer-readable program instructions described here may be downloaded from a computer-readable storage medium to various computing/processing devices or downloaded to an external computer or an external storage device through a network, such as the Internet, a local area network, a wide area network, and/or a wireless network. The network may include copper transmission cables, optical fiber transmission, wireless transmission, routers, firewalls, switches, gateway computers, and/or edge servers. A network adapter card or network interface in each computing/processing device receives the computer-readable program instructions from the network and forwards the computer-readable program instructions for storage in a computer-readable storage medium in each computing/processing device.

The computer program instructions for performing the operation of the present disclosure may be assembly instructions, instruction set architecture (ISA) instructions, machine instructions, machine-related instructions, microcodes, firmware instructions, state setting data, or source codes or object codes written in any combination of one or more programming languages, and the programming languages include object-oriented programming languages, such as Smalltalk, C++, etc., and conventional procedural programming languages, such as "C" language or similar programming languages. The computer-readable program instructions may be executed completely on a user computer, partially on a user computer, as an independent software package, partially on a user computer and partially on a remote computer, or completely on a remote computer or server. In a case involving a remote computer, the remote computer may be connected to a user computer through any type of networks, including a local area network (LAN) or a wide area network (WAN), or may be connected to an external computer (e.g. via the Internet by utilizing an Internet service provider). In some embodiments, an electronic circuit, such as a programmable logic circuit, a field programmable gate array (FPGA) or a programmable logic array (PLA), may be customized by utilizing state information of computer-readable program instructions, and the electronic circuit can execute the computer-readable program instructions to implement every aspect of the present disclosure.

Every aspect of the present disclosure has been described here with reference to the flowcharts and/or block diagram of the method, the apparatus (system) and the computer program product according to the embodiments of the present disclosure. It should be understood that each block of the flowcharts and/or block diagrams and combinations of the blocks in the flowcharts and/or block diagrams can be implemented by the computer-readable program instructions.

These computer-readable program instructions may be provided for a processing unit of a general-purpose computer, a special-purpose computer or other programmable data processing apparatuses to produce a machine, so that when being executed by the processing unit of the computer or other programmable data processing apparatuses, these instructions produce an apparatus for implementing the functions/actions specified in one or more blocks in the flowcharts and/or the block diagrams. These computer-readable program instructions may also be stored in a computer-readable storage medium. These instructions cause a computer, a programmable data processing apparatus and/or other devices to operate in a particular manner, so that the computer-readable medium that stores the instructions includes an article of manufacture, which contains the instructions that implement every aspect of the functions/actions specified in one block or more blocks in the flowcharts and/or the block diagrams.

The computer-readable program instructions may also be loaded into a computer, other programmable data processing apparatuses, or other devices, so that a series of operating steps can be performed on the computer, other programmable data processing apparatuses or other devices to produce a computer-implemented process, and thereby the instructions that are executed on the computer, other programmable data processing apparatuses or other devices can implement the functions/actions specified in one or more blocks in the flowcharts and/or the block diagrams.

The flowcharts and block diagrams in the accompanying drawings show the possibly implemented architectures, functions and operations of the system, the method and the computer program product according to various embodiments of the present disclosure. In this regard, each block in the flow charts or the block diagrams may represent for a part of a module, a program segment or an instruction, and a part of the module, the program segment or the instruction includes one or more executable instructions for realizing a specified logic function. In some alternative implementations, the function marked in the block may also happen in an order different from that marked in the accompanying drawings. For example, actually, two continuous blocks may be basically concurrently executed and sometimes may also be executed according to an opposite order, which is decided by involved functions. It should also be noted that each block in the block diagrams and/or the flow charts as well as a combination of the blocks in the block diagrams and/or the flow charts may be realized by using a special system used for executing the specified function or action and based on hardware or may be realized by using a combination of special hardware and a computer instruction.

The various embodiments of the present disclosure have been described above. The foregoing description is exemplary, not exhaustive, and is not intended to be limited to the disclosed embodiments. Multiple modifications and variations will be apparent to those skilled in the art without departing from the scope and spirit of the illustrated embodiments. The terms used herein are chosen to best explain the principles of the embodiments, practical applications, or improvements on technologies in the marketplace or to enable others of ordinary skill in the art to understand the embodiments disclosed herein.

The invention claimed is:

1. A method for data deduplication in a multi-node storage system, comprising:
   receiving a data stream of a backup;
   dividing the data stream into a plurality of blocks of the backup;
   merging a plurality of the blocks into a super block of the backup;
   determining a similarity hash value of the super block, wherein the similarity hash value indicates similarity between the super block and a plurality of super blocks, wherein determining the similarity hash value of the super block comprises:
      determining a signature matrix of the backup in which the super block is included by taking blocks as features through MinHash, wherein the signature matrix is determined by sampling the super block to obtain a portion of the blocks that is less than all of the plurality of blocks in the super block, and determining the signature matrix for the super block by taking the portion of the blocks as features, and
      based on the signature matrix, calculating the similarity hash value through locality sensitive hashing;
   comparing, using one or more distributed hash tables (DHTs), the similarity hash value of the super block with a similarity hash value range associated with a node of the multi-node storage system to determine whether the similarity hash value is within the similarity hash value range, wherein the similarity hash value range is stored in the one or more DHTs, and wherein the one or more DHTs is used as a cache;
   making a determination that the similarity hash value is outside the similarity hash value range;
   allocating the super block to the node based on the determination;
   updating the similarity hash value range by adding a range number to the similarity hash value to set an upper bound of the similarity hash value range and subtracting the range number from the similarity hash value to set a lower bound of the similarity hash value range; and
   storing the super block in a memory of the node, based on allocating the super block to the node and in response to updating the similarity hash value.

2. An electronic device, comprising
   a processing unit;
   a memory, coupled to the processing unit and comprising instructions stored therein, the instructions causing the electronic device to perform a method when being executed by the processing unit, the method comprising:
      receiving a data stream of a backup;
      dividing the data stream into a plurality of blocks of the backup;
      merging a plurality of the blocks into a super block of the backup;
      determining a similarity hash value of the super block, wherein the similarity hash value indicates similarity between the super block and a plurality of super blocks, wherein determining the similarity hash value of the super block comprises:
         determining a signature matrix of the backup in which the super block is included by taking blocks as features through MinHash, wherein the signature matrix is determined by sampling the super block to obtain a portion of the blocks that is less then all of the plurality of blocks in the super block, and determining the signature matrix for the super block by taking the portion of the blocks as features, and based on the signature matrix, calculating the similarity hash value through locality sensitive hashing;
      comparing, using one or more distributed hash tables (DHTs), the similarity hash value of the super block with a similarity hash value range associated with a node of a multi-node storage system to determine whether the similarity hash value is within the similarity hash value range, wherein the similarity hash value range is stored in the one or more DHTs, and wherein the one or more DHTs is used as a cache;

making a determination that the similarity hash value is outside the similarity hash value range;

allocating the super block to the node based on the determination;

updating the similarity hash value range by adding a range number to the similarity hash value to set an upper bound of the similarity hash value range and subtracting the range number from the similarity hash value to set a lower bound of the similarity hash value range; and storing the super block in a node memory of the node, based on allocating the super block to the node and in response to updating the similarity hash value.

3. A computer-readable storage medium, wherein machine-executable instructions are stored in the computer-readable storage medium, and the machine-executable instructions cause at least one processor to implement a method when being executed by the at least one processor, the method comprising:

receiving a data stream of a backup;

dividing the data stream into a plurality of blocks of the backup;

merge a plurality of the blocks into a super block of the backup;

determining a similarity hash value of the super block, wherein the similarity hash value indicates similarity between the super block and a plurality of super blocks, wherein determining the similarity hash value of the super block comprises:

determining a signature matrix of the backup in which the super block is included by taking blocks as features through MinHash, wherein the signature matrix is determined by sampling the super block to obtain a portion of the blocks that is less than all of the plurality of blocks in the super block, and determining the signature matrix for the super block by taking the portion of the blocks as features, and based on the signature matrix, calculating the similarity hash value through locality sensitive hashing;

comparing, using one or more distributed hash tables (DHTs), the similarity hash value of the super block with a similarity hash value range associated with a node of a multi-node storage system to determine whether the similarity hash value is within the similarity hash value range, wherein the similarity hash value range is stored in the one or more DHTs, and wherein the one or more DHTs is used as a cache;

making a determination that the similarity hash value is outside the similarity hash value range;

allocating the super block to the node based on the determination;

updating the similarity hash value range by adding a range number to the similarity hash value to set an upper bound of the similarity hash value range and subtracting the range number from the similarity hash value to set a lower bound of the similarity hash value range; and storing the super block in a memory of the node, based on allocating the super block to the node and in response to updating the similarity hash value.

* * * * *